J. MOHAN.
NUT LOCK.
APPLICATION FILED MAY 14, 1912.
1,042,584.
Patented Oct. 29, 1912.
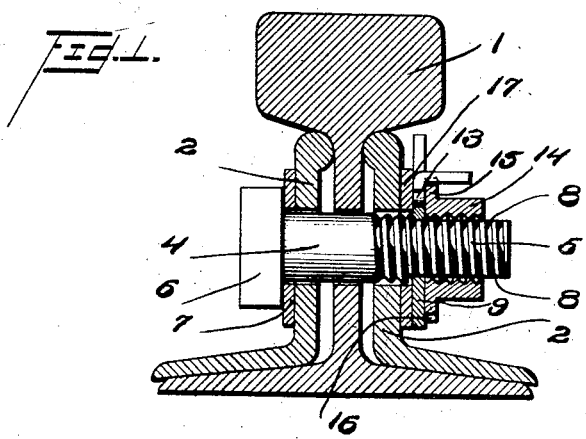
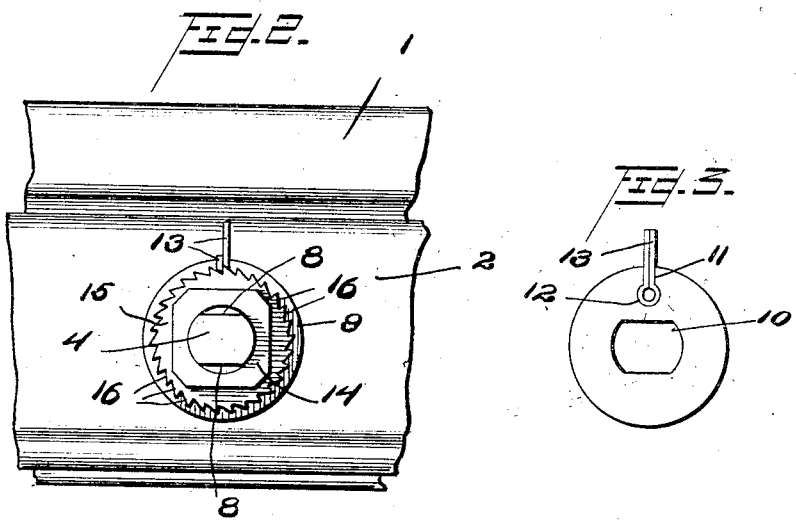
Witnesses
H. Strauss
R. H. Krenkel
Inventor
John Mohan
By Joshua R. H. Potts
Attorney

UNITED STATES PATENT OFFICE.

JOHN MOHAN, OF PHILADELPHIA, PENNSYLVANIA.

NUT-LOCK.

1,042,584.

Specification of Letters Patent.

Patented Oct. 29, 1912.

Application filed May 14, 1912. Serial No. 697,119.

*To all whom it may concern:*

Be it known that I, JOHN MOHAN, a citizen of the United States, residing at Philadelphia, in the county of Philadelphia and State of Pennsylvania, have invented certain new and useful Improvements in Nut-Locks, of which the following is a specification.

My invention relates to improvements in nut locks and has for an object to provide a device of this character in which the nut is locked against turning movement by means of a key attached to a washer, the latter being incapable of rotary motion.

A further object is to provide a bolt having one or more flattened faces, and a washer having an opening the shape of the bolt, whereby the washer is prevented from turning.

With these and other objects in view, the invention consists in certain novel features of construction and combinations and arrangements of parts, as will be more fully hereinafter described and pointed out in the claims.

In the accompanying drawings: Figure 1, is a view in cross section illustrating my improvements in connection with a rail joint. Fig. 2, is a side view of the same. Fig. 3, is a view in elevation illustrating the locking washer and locking key, and Fig. 4, is a detail perspective view of the locking key removed.

1, represents a rail and 2, 2, the fish plates through the openings of which my improved bolt 4 is projected. The bolt 4 is screw-threaded as shown at 5, and at one end has a head 6 bearing against a washer 7. The screw-threaded portion 5 of the bolt 4 is flattened on two opposite faces as shown at 8, 8, and a locking washer 9 is provided having an opening 10 therein. This opening 10 in the washer has two flattened walls corresponding to the flattened faces of the bolt and when the washer 9 is positioned on the bolt, it is prevented from turning by reason of the flattened faces. The washer 9 also has a recess 11 therein extending inwardly from its outer edge, and this recess which is enlarged at its inner end as shown at 12, is adapted to receive a locking key 13 which has the general shape of a cotter pin as seen most clearly in Figs. 3, and 4, having its legs projecting beyond the edge of the washer. A nut 14 is provided at one end with a circular enlargement 15, the latter at its edge being formed with ratchet teeth 16 for a purpose hereinafter explained.

In operation, the bolt is positioned in the openings in the rail and fish plates and the locking washer 9 placed thereon, a spacing washer 17 being interposed between the said locking washer 9 and the fish plate 2. The nut 14 is then screwed on and when it has been tightly jammed, one leg of the locking key is bent inwardly parallel with the bolt. This leg will engage between the ratchet teeth 16, and securely lock the nut, as the washer 9 is prevented from turning because of the flattened walls in the opening 10.

I provide the key 13 with two legs so that when the nut is screwed home, if the highest point of a ratchet tooth is directly beneath one leg, the other one can be bent, but it is to be understood that only one leg need be bent to lock the nut.

I have shown my improved nut lock in connection with a rail joint and so described the same, but I would have it understood that my improvements are not limited to this class alone, but may be used wherever it can be adapted.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A nut lock comprising a washer, constructed to be held against rotary movement on a bolt, said washer having a recess extending inwardly from its periphery and having an enlarged inner end, a key in said recess comprising a strip of metal bent between its ends forming an enlargement and parallel legs, said enlargement located in the enlarged inner end of the recess and said legs projecting beyond the periphery of the washer, and adapted to be bent into locked engagement with a nut, substantially as described.

2. A nut lock comprising a washer constructed to be held against rotary movement on a bolt, said washer having a recess extending inwardly from its periphery and having an enlarged inner end, a key in said recess comprising a strip of metal bent between its ends forming an enlargement and parallel legs, said enlargement located in the enlarged inner end of the recess and said legs projecting beyond the periphery of the washer, a nut, a circular enlargement on the inner end of the nut adapted to be positioned against the washer, and a circular series of teeth on said enlargement between which one of said key legs are adapted to be positioned, substantially as described.

In testimony whereof I have signed my name to this specification in the presence of two subscribing witnesses.

JOHN MOHAN.

Witnesses:
L. A. DEMPSEY,
MAURICE E. GERHARD.